United States Patent [19]

Harvey

[11] 3,717,077
[45] Feb. 20, 1973

[54] EXPOSURE CONTROL APPARATUS

[75] Inventor: Donald Malcolm Harvey, Webster, N.Y.

[73] Assignee: Eastman Kodak Company, Rochester, N.Y.

[22] Filed: Feb. 22, 1972

[21] Appl. No.: 227,968

[52] U.S. Cl............95/10 CE, 95/10 C, 250/214 P, 356/222
[51] Int. Cl..............................................G01j 1/44
[58] Field of Search..95/10 C, 10 CE, 10 CT, 10 CD, 95/10 PO; 356/222

[56] References Cited

UNITED STATES PATENTS 2,186,613  1/1940  Mihalyi................95/10 C
3,563,143  2/1971  Petersen................356/222

Primary Examiner—Samuel S. Matthews
Assistant Examiner—Russel E. Adams, Jr.
Attorney—W. H. J. Kline et al.

[57] ABSTRACT

A multiple segmented photocell has its segments connected to a multichannel amplifier to which is also applied a reference signal representative to the total scene illumination and is operative to limit the output signal from any portion of the photocell which may result from a portion of the scene which has an inordinately high amount of illumination.

5 Claims, 4 Drawing Figures 3,717,077

EXPOSURE CONTROL APPARATUS

BACKGROUND OF THE INVENTION

1. Field of the Invention

This invention relates generally to exposure control apparatus for a photographic camera, and more particularly to exposure control apparatus using multiple light sensing means operative to establish the exposure control signals for the camera.

2. Description of the Prior Art

Generally in photography and in particular in the so-called available light photography, dimly lit scenes may include some form of an artificial light source which can create considerable exposure error when a conventional integrating photometric system is employed. It would be desirable that the exposure should be based primarily on those portions of the subject which are normally illuminated, but should substantially disregard those sources of inordinately high illumination in the scene. Generally the sources of illumination included within the field of a photometric system provide the major portion of the light intensity striking the photosensor with the result being a general under exposure of the normally illuminated subject matter and a normal exposure of the source of illumination, which generally is an unsatisfactory overall result.

The above-described situation has long been recognized and various attempts have been made to compensate for subjects having differing degrees of brightness in a particular scene. For example, U.S. Pat. No. 3,428,403 issued Feb. 18, 1969 to Masaichiro Konishi describes a system using a segmented photoresistor connected in series, with each of the segments being exposed essentially to a different portion of the scene being photographed. Another U.S. Pat. No. 3,473,453 issued Oct. 21, 1969 to Thomas Gross describes a photometric system using a plurality of four photoresistors connected in a series-parallel configuration to take into account portions of the scenes having different light intensities. While these systems have begun to compensate for portions of the scene having varying degrees of illumination, because of the serial connection of at least two of the segmented photoresistors, they do not truly isolate and consider individually each of the areas of the scene to be photographed.

OBJECTS AND SUMMARY OF THE INVENTION

Accordingly it is a principal object of the invention to provide an electronic exposure control system which overcomes the disadvantages of the prior art.

Another object of the invention is to provide an electronic exposure control system using a multiple photocell operative to independently evaluate various sectors of the scene to be photographed.

Yet another object of the invention is to provide an automatic exposure control apparatus which effectively averages out or balances out portions of the scene having unduly high illumination therein.

The foregoing and other objects are accomplished according to one aspect of the invention wherein a segmented photocell has each portion thereof connected in parallel to a summing and averaging circuit and to a multichannel amplifier. In the averaging circuit the gross detected signal is determined and then is divided by a predetermined value to yield a reference signal which is in turn applied to the amplifier circuitry to effectively provide a maximum bias for each of the portions of the signal from the segmented photocell. The outputs from the amplifier circuitry are in turn applied to a second summing circuit the output of which is applied to the electronic exposure control circuitry in a normal fashion. In this fashion, bright light spots are partially biased out to minimize this effect on the exposure control apparatus so that the normally illuminated portions of the scene are not under-exposed during the picture-taking process.

DESCRIPTION OF THE PREFERRED EMBODIMENTS

The foregoing and other objects and advantages of the present invention will become more readily apparent upon taking the following detailed description in conjunction with the above-described drawings.

Figure 1:
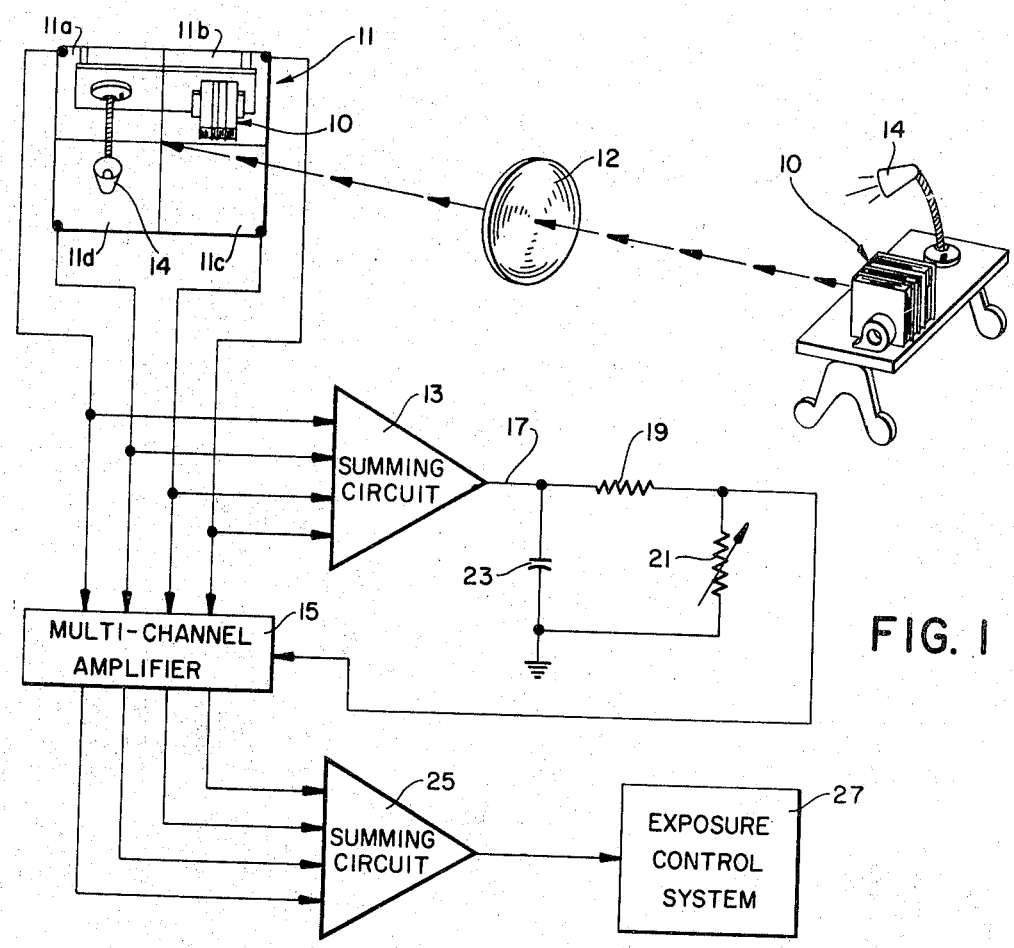
FIG. 1 is a schematic circuit diagram, partially in block, illustrating one aspect of the electronic exposure control circuitry according to the present invention.

Referring first to FIG. 1, there is shown a multiple segmented photocell 11 having segments 11a, 11b, 11c and 11d. The light from a scene 10 passes through a lens 12 to impinge upon the photocell 11. A battery or other source of energizing potential (not shown) is generally applied to the segments of the photocell 11. Outputs from the individual sections of the photosensor 11 are applied in parallel to a summing circuit 13 and also the same outputs are applied to a multichannel amplifier 15. The output 17 of the summing circuit 13 is applied across a first resistor 19 and a second resistor 21 to ground, with the junction of the two resistors being applied to an additional input of the multichannel amplifier 16. A capacitor 23 is also connected between the output 17 of the summing circuit 13 and ground. The output from a multichannel amplifier consists of an output corresponding to each one of the inputs from the photocell 11 and these outputs are applied in parallel to a second summing circuit 25, the output of which is applied in normal fashion to a typical exposure control system or apparatus 27.

In operation, the outputs from the photocell 11 are applied to the summing circuit 13 are operative therein to establish a gross signal from which a reference signal as determined by the amplification factor of the summing circuit 13 and the relative values of the resistors 19 and 21 is derived. The reference signal is applied to the multichannel amplifier. The variable resistor 21 permits relative adjustment of the reference signal to be applied to the multichannel amplifier 21. The signal applied from the junction of the resistors 19 and 21 to the multichannel amplifier operates as a bias on each channel of the amplifier to set a maximum limit on the usable portion of the output from each of the photocell sectors. Then the outputs from each channel of the multichannel amplifier 15 are applied to the summing circuit 25, which combines the signals to provide the net signal to be applied to the normal exposure control system of the camera.

As an alternate to the embodiment of FIG. 1, rather than using a separate summing circuit to determine the reference voltage it would be possible to use a second photocell 31 having its output connected across resistors 33 and 35 connected in series to ground with a junction thereof applied to the multichannel amplifier 15. The second photocell 31 in conjunction with its lens 36 is placed in a predetermined relation with the primary photocell 11 to make sure that the same scene illumination is being detected by each photocell so that the gross output of the photocell 31 is relative to the multiple outputs of the photocell 11. The remaining operation of the apparatus of FIG. 2 is the same as the operation of FIG. 1.

Figure 3:
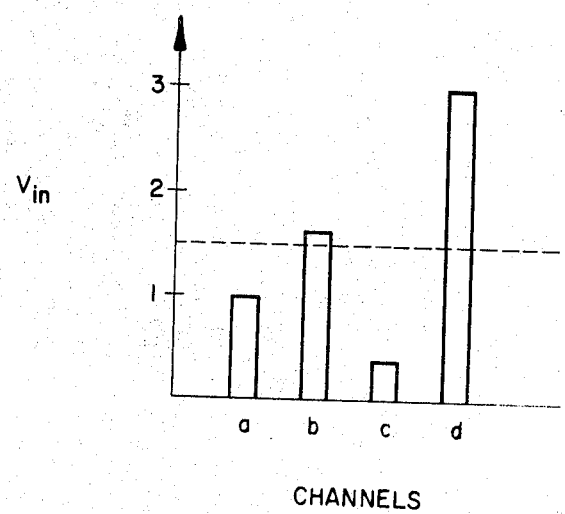
FIG. 3 is a graphical presentation of the gross signals derived from a segmented photocell.
Figure 2:
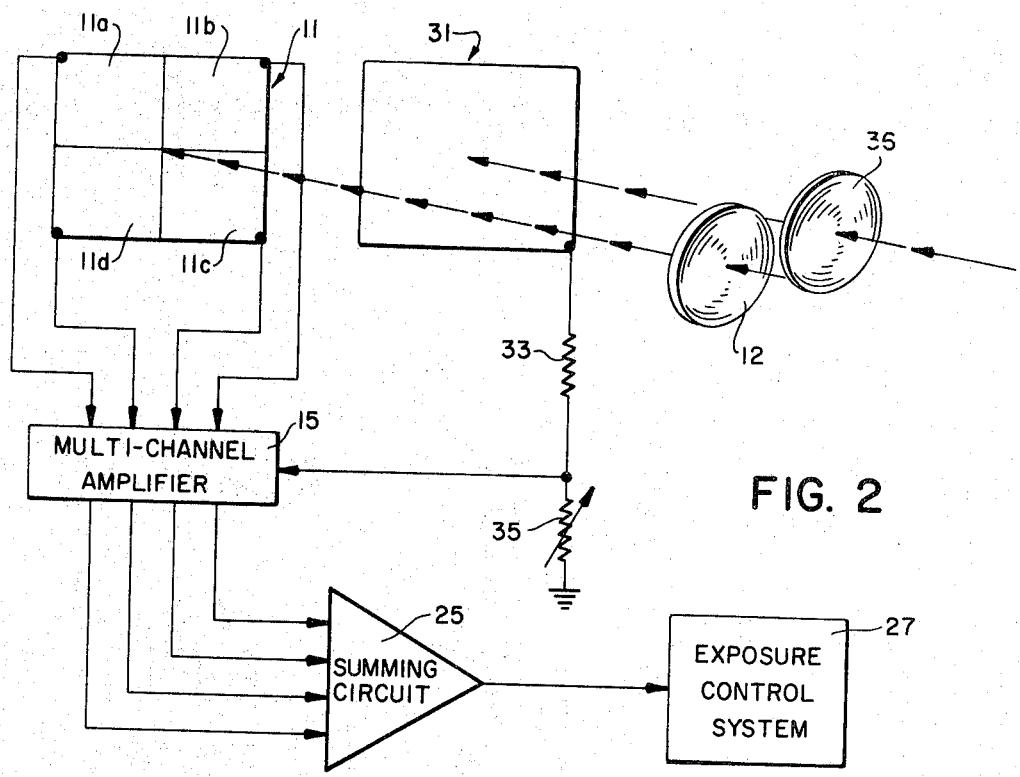
FIG. 2 is a schematic circuit diagram illustrating an alternative version of the electronic exposure control circuitry according to the present invention.
Figure 4:
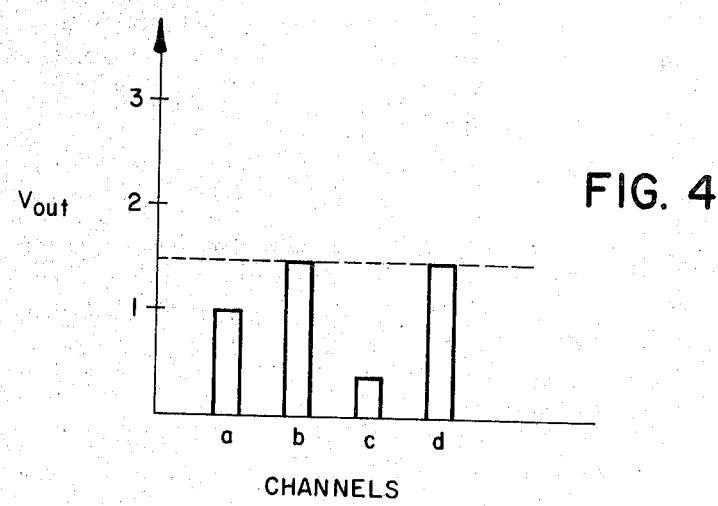
FIG. 4 is a graphical representation of the net signals applied to the exposure control apparatus, when utilizing control circuitry according to the present invention.

In order to better understand the operation of the circuitry of FIG. 1 or FIG. 2, reference is made to FIGS. 3 and 4. FIG. 3 graphically represents what might be a typical output from each of the segments of the photosensor 11 of FIG. 1 or FIG. 2. In this particular illustration, it is assumed that a bright source of illumination such as the lamp 14 of the scene in FIG. 1 impinges upon segment $d$ of the photocell thereby resulting in an inordinately high output signal from this segment. The signals are applied to the summing circuit 13 to determine a gross signal and are then divided down by the resistor divider network 19 and 21, and a suitable bias applied to the multichannel amplifier which limits the output of each channel as indicated in FIG. 4. The reference level may be chosen as any reasonable fraction of the gross signal depending upon the particular system requirements. As seen in FIG. 4, the voltage output from the multichannel amplifier is such that segments $a$ and $c$ are relatively unchanged, segment $b$ is slightly diminished and segment $d$ is severly limited. These outputs are then applied to the second summing circuit 25 which provides the net signal to the exposure control system.

While the foregoing represents what may be taken to be a preferred embodiment of the invention, it should be noted that the technique of determining cutoff or reference voltage may include a system of weighting the cutoff such that its effect diminishes as the summed gross signal increases. Thus, in scenes which are significantly brighter, it would be inferred that the sources of illumination included within the scene have a less deleterious effect on the overall exposure determination period. Therefore at some point in the brightness scale, which would be determined by the system requirements, the primary source of light might be, for example, the sun and the cutoff level could be disregarded altogether.

While the invention has been described generally as using a photocell sensing device, it will be apparent to those skilled in the art that any device capable of detecting varying amounts of light may be used. Also, while there has been shown a four segment photocell, it will be further apparent that any number of segments depending on design requirements or engineering preference may be used.

The invention has been described in detail with particular reference to the preferred embodiments thereof, but it will be understood that variations and modifications can be affected within the spirit and scope of the invention.

I claim:

1. For use in a camera having exposure control means, circuitry operative to establish a control signal for the exposure control means, comprising:
   a. light responsive means including a plurality of individual segments adapted to receive light from respective portions of a scene to be photographed, each of the segments of said light responsive means having an electrical parameter which varies in accordance with the intensity of light incident thereon;
   b. first circuit means containing a plurality of amplifiers, one for each of said segments of said light responsive means, including means for connecting the output of each of said segments to a respective one of said plurality of amplifiers;
   c. means for deriving a reference signal related in value to the total scene illustration received by said light responsive means; and
   d. means for applying a portion of said reference signal to each of said channels, operative thereby to selectively limit the output from each of said amplifiers.

2. For use in a camera having exposure control means, circuitry operative to establish a control signal for the exposure control means, comprising:
   a. light responsive means including a plurality of individual segments adapted to receive light from respective portions of a scene to be photographed, each of the segments of said light responsive means having an electrical parameter which varies in accordance with the intensity of light incident thereon;
   b. first circuit means operative to receive inputs from each of the segments of said light responsive means and to provide an output therefrom as a single signal related to the sum of the individual portions;
   c. second circuit means containing a plurality of channels, one for each of said segments of said light responsive means;
   d. means for connecting each of said segments to a respective one of said plurality of channels of said second circuit means;
   e. means for applying a portion of the output from said first circuit means to each of the channels of said second circuit means operative thereby to selectively limit the output from each of said channels; and
   f. means adapted to receive the outputs from said second circuit means and provide therefrom a net control signal to be applied to the exposure control means.

3. The invention according to claim 2 wherein said first circuit means is a summing amplifier.

4. The invention according to claim 2 wherein the means for deriving a portion of the output from said first circuit means to be applied to said multichannel amplifier comprises first and second resistors connected between the output of said first circuit means and a source of reference potential, with the junction of said first and second resistors applied to an input of said second circuit means;

5. For use in a camera having exposure control means, circuitry operative to establish a control signal for the exposure control means, comprising:
   a. light responsive means including a plurality of individual segments adapted to receive light from respective portions of a scene to be photographed, each of the segments of said light responsive means having an electrical parameter which varies in accordance with the intensity of light incident thereon;
   b. first circuit means containing a plurality of channels, one for each of the segments of said light responsive means;
   c. means for connecting each of the segments to a respective one of the plurality of channels of said first circuit means;
   d. second light responsive means adapted to receive light from the scene to be photographed, said second light responsive means having a parameter which varies in accordance with the intensity of light incident thereon;
   e. means for applying a portion of the output from said second light responsive means to each of the channels of said first circuit means operative thereby to limit the output from each of said channels; and
   f. second circuit means adapted to receive the outputs from said first circuit means and provide therefrom a net signal to be applied to the exposure control means.

* * * * *